United States Patent

Jurewicz et al.

Patent Number: 5,211,156
Date of Patent: May 18, 1993

[54] METHOD AND APPARATUS FOR TREATING A SURFACE OF GRANITE WITH A HIGH TEMPERATURE PLASMA JET

[75] Inventors: Jerzy Jurewicz; Maher Boulos; Clermont Roy, all of Sherbrooke, Canada

[73] Assignee: Universite De Sherbrooke, Sherbrooke, Canada

[21] Appl. No.: 775,976

[22] PCT Filed: May 1, 1990

[86] PCT No.: PCT/CA90/00144

§ 371 Date: Nov. 1, 1991

§ 102(e) Date: Nov. 1, 1991

[87] PCT Pub. No.: WO90/13406

PCT Pub. Date: Nov. 15, 1990

[30] Foreign Application Priority Data

May 3, 1989 [CA] Canada ................ 598,629

[51] Int. Cl.$^5$ .................. B28D 1/00; C04B 41/53
[52] U.S. Cl. .................. 125/1; 219/121.39; 219/121.44; 175/14; 175/16; 299/14
[58] Field of Search ......... 125/1; 219/121.36, 121.39, 219/121.44, 121.48, 121.49, 121.59; 175/11, 14, 16, 12, 65-67; 299/14, 16-17; 241/1

[56] References Cited

U.S. PATENT DOCUMENTS

| | | | |
|---|---|---|---|
| 1,025,029 | 4/1912 | Sutton | 175/11 |
| 2,655,909 | 10/1953 | Aitchison et al. | 125/1 |
| 2,781,754 | 2/1957 | Aitchison et al. | 125/1 |
| 3,004,137 | 10/1961 | Karlovitz | 175/16 |
| 3,103,251 | 10/1963 | Browning | 175/14 |
| 3,122,212 | 2/1964 | Karlovitz | 175/16 |
| 3,211,242 | 10/1965 | Browning | 175/14 |
| 3,245,721 | 4/1966 | Margiloff | 299/14 |
| 3,251,394 | 5/1966 | Thorpe et al. | |
| 3,476,194 | 11/1969 | Browning | 175/14 |
| 3,556,600 | 1/1971 | Shoupi et al. | 219/121.18 X |
| 3,589,351 | 6/1971 | Shoupp et al. | 125/1 |
| 3,704,914 | 12/1972 | Fletcher, Jr. | 299/14 |
| 3,725,633 | 4/1973 | Schumacher et al. | 219/121.24 X |
| 3,788,703 | 1/1974 | Thorpe | 299/14 |

FOREIGN PATENT DOCUMENTS

| | | |
|---|---|---|
| 788487 | 1/1973 | Belgium . |
| 0229318 | 12/1986 | European Pat. Off. . |
| 2251178 | 6/1975 | France . |
| 147729 | 9/1931 | Switzerland ............ 125/1 |
| 599845 | 5/1978 | Switzerland . |
| 417300 | 2/1974 | U.S.S.R. . |
| 457611 | 1/1975 | U.S.S.R. . |

OTHER PUBLICATIONS

"Chemical Abstracts", vol. 105, No. 6, Aug. 1986, (Colombus, Ohio, U.S.A.) p. 294, Abstract No. 65216 f and JP-A-6 195 839 (Sumitomo Electric Industries, Ltd.) May 14, 1986.

Primary Examiner—Bruce M. Kisliuk
Assistant Examiner—John A. Marlott
Attorney, Agent, or Firm—Darby & Darby

[57] ABSTRACT

The method and apparatus treat a surface of natural rock or artificial stone-like material to give to this surface an attractive finish. A high temperature jet of plasma and a high speed jet of cooling fluid are projected onto the surface to be treated. The two jets are moved on the surface at a given speed with the jet of cooling fluid following the plasma jet. The speed of movement is selected so that the high temperature plasma jet heats only a thin superficial layer of rock or stone-like material. As the jet of cooling fluid follows the jet of plasma, it suddenly cools the thin superficial layer just heated by the plasma jet to cause a thermal shock which bursts particles of rock or stone-like material at the surface thereof, and blows these particles off the rock surface.

13 Claims, 2 Drawing Sheets

METHOD AND APPARATUS FOR TREATING A SURFACE OF GRANITE WITH A HIGH TEMPERATURE PLASMA JET

BACKGROUND OF THE INVENTION

1. Field of the Invention

The present invention relates to a method and apparatus for treating the surface of a body of natural rock or artificial stone-like material, to give to the latter surface an attractive finish. The method and apparatus use for that purpose a high temperature jet of plasma and a high speed jet of cooling fluid.

2. Brief Description of the Prior Art

A method which is presently widely used to treat surfaces of natural rocks, in particular granite, consists in heating the surface of granite to cause bursting of the crystals at the said surface to give to the latter a glossy and attractive finish. Actually, exploitation on an industrial scale of the above method makes use of a flame obtained through combustion of natural gas or other combustible fuel to heat the granite surface in order to carry out the desired treatment. U.S. Pat. No. 2,655,909 (R. B. Aitchison et al.) issued on Oct. 20, 1953, and U.S. Pat. No. 3,251,394 (M. L. Thorpe et al.) issued on May 17, 1986, both describe a treatment method of this type. Such a method is not only expensive, but is also slow whereby a treated slab of granite is heated throughout its thickness. Important stresses are thereby imposed to the granite material, which stresses frequently cause fissuring and cracking of the processed slab. This drawback considerably increases the minimum thickness of slabs of which the surface can be treated without risk of deep fissuring, breaking or the like.

U.S. Pat. No. 2,781,754 (R. B. Aitchison et al.) issued on Feb. 19, 1957, relates to the thermal texturing of a surface of natural rocks by means of a flame produced through an oxy-fuel gas blowpipe. The slab of rock is immersed in water to minimize heating thereof. This texturing method is also restricted to thick slab of rock, the minimum thickness being of about 1.91 cm (¾").

U.S. Pat. No. 3,704,914 granted to Ralph Andrew Fletcher Jr. on Dec. 5, 1972 describes a method of cutting rock by means of a flame. The flame impinges upon a surface to be cut and material at the surface is rapidly heated by the flame to a state of massive incandescence. As heat penetrates and the heat front advances, there is also produced beneath the zone of incandescence a substrate of thermally fractured material. A jet of water is applied to the incandesced surface at an angle enabling it to penetrate the thermally fractured substrate. Obviously, the method of Fletcher Jr. heats deeply the rock material to result in the above discussed drawback.

French patent No. 2,251,178 granted to Humphreys Corporation and published on Jun. 6, 1975, proposes a method for producing deep grooves in a body of rock. The rock is dielectrically heated by means of an arc transferred between a jet of plasma and an auxiliary electrode, made of graphite, or between two jets of plasma. The method disclosed in French patent No. 2,251,179, capable of cutting deep grooves in a body of rock, is obviously not adapted to treat the surface of a thin slab of natural rock or artificial stone-like material.

OBJECTS OF THE INVENTION

An object of the present invention is therefore to provide a method and an apparatus for treating a surface of hard material constituted by natural rock and/or artificial stone-like material which eliminate the above discussed drawbacks of the prior art.

An other object of the present invention is to use a high temperature jet of plasma to treat the surface of natural rock or artificial stone-like material.

A further object of the subject invention is to provide a method and an apparatus for treating a surface of natural rock or artificial stone-like material which present the advantages of being fast and economical, and of enabling treatment of the surface of slabs as thin as 0.95 cm (⅜").

SUMMARY OF THE INVENTION

To achieve the above objects, the invention uses a high temperature jet of plasma projected onto the surface to be treated during a short period of time whereby only a thin layer of natural rock or artificial stone-like material is heated. As only a thin layer of hard material is heated by the jet of plasma, the treatment is fast, energetically economical, and protects the treated slab against any fissuring, cracking or the like due to the treatment.

More specifically, in accordance with the present invention, there is provided a method of treating the surface of a body of hard material constituted by natural rock and/or artificial stone-like material, comprising the steps of:

producing a high temperature jet of plasma projected onto the surface to be treated;

producing a high speed jet of cooling fluid also projected onto the body surface;

moving the plasma jet with respect to the surface of the body at a given speed, which speed is so selected that the high temperature plasma jet heats only a thin layer of hard material; and moving the jet of cooling fluid with respect to the surface, said high speed jet of cooling fluid being so moved with respect to the surface of the body as to follow the plasma jet on the surface whereby the jet of cooling fluid (a) suddenly cools the thin layer of hard material just heated by the plasma jet to cause a thermal shock which bursts particles of hard material at the surface of the body, and (b) blows the so burst particles off the said surface.

The subject invention is also concerned with an apparatus for treating the surface of a body of hard material constituted by natural rock and/or artificial stone-like material, comprising:

first means for producing a high temperature jet of plasma projected onto the surface to be treated;

second means for producing a high speed jet of cooling fluid also projected onto the surface to be treated;

mechanical support means on which the first and second jet producing means are mounted; and means for moving the support means with respect to the surface to be treated at a given speed, with the jet of cooling fluid following the jet of plasma on the surface of hard material, the said given speed being so selected that the high temperature plasma jet heats only a thin layer of hard material.

In operation, the high speed jet of cooling fluid (a) suddenly cools the thin layer of hard material just heated by the plasma jet to cause a thermal shock which bursts particles of hard material at the surface to be treated, and (b) blows the so burst particles off the body surface.

In accordance with a preferred embodiment of the invention, the jet of plasma and the jet of cooling fluid define with the surface of hard material respective first and second angles of different values.

The objects, advantages and other features of the present invention will become more apparent upon reading of the following non restrictive description of a preferred embodiment thereof, given with reference to the accompanying drawings.

DETAILED DESCRIPTION OF THE PREFERRED EMBODIMENT

Figure 1:
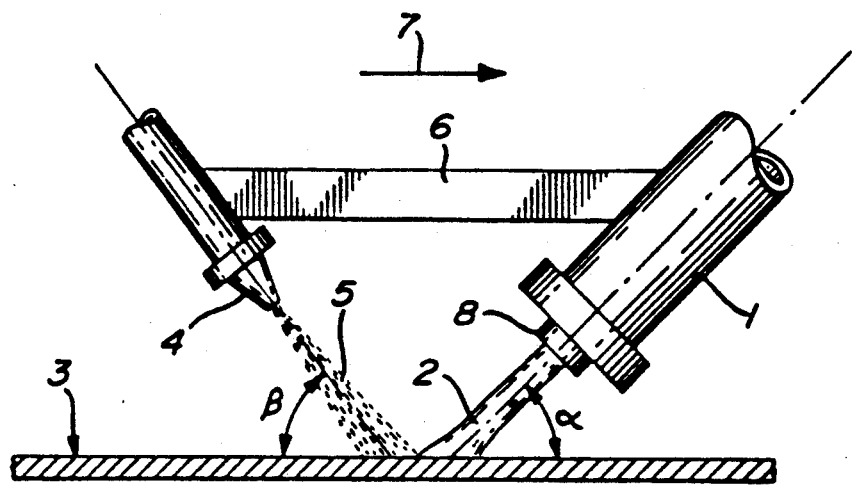
FIG. 1 illustrates first positions and orientations of a plasma torch and of a water nozzle in an apparatus in accordance with the present invention for treating the surface of a body of hard material constituted by natural rock and/or artificial stone-like material.

Referring now to FIG. 1 of the attached drawings, the apparatus in accordance with the present invention comprises a direct current plasma torch 1 producing a high temperature jet of plasma 2 projected onto the surface 3 of hard material constituted by natural rock and/or artificial stone-like material. As can be seen in FIG. 1, the jet of plasma 2 defines with the surface 3 an acute angle $\alpha$.

A nozzle 4 supplied with water under pressure produces a high speed jet of water (cooling fluid) identified by the reference numeral 5 in FIG. 1, which water jet 5 is projected onto the surface 3. The water jet 5 also defines with the surface 3 an acute angle $\beta$.

The two jets 2 and 5 lie into a same vertical plane and are oriented in directions intersecting in this plane. The torch 1 and the nozzle 4 are attached to each other through a suitable support member 6.

The torch 1 and nozzle 4 are moved with respect to the surface 3 in a direction parallel to the plane in which are lying the plasma and water jets 2 and 5, which direction of movement is indicated by the arrow 7 in FIG. 1, considering the surface 3 is stationary. As can be appreciated, the water jet 5 follows the plasma jet 2 on the surface 3 as the torch 1 and nozzle 4 are moved in the direction 7.

The jet of plasma 2 is constituted by an ionized gas at a very high temperature (of the order of 10,000° to 12,000° C.). emerging at high speed from the tip of the nozzle 8 of the plasma torch 1. The very high temperature, as well as the high thermal conductivity of the plasma jet 2 produce important global heat fluxes at the surface 3 in front of the jet 2. In the case of a slab of natural rock or artificial stone-like material of which the surface 3 is exposed to the jet 2 of plasma during a short period of time, the high thermal flux rapidly heats the surface 3, however, the thermal front has not enough time to penetrate throughout the slab. Accordingly, only a thin layer of hard material at the surface 3 is heated by the jet of plasma, whereby the treatment is rapid and energetically economical, and protects the slab of which the surface 3 is treated against any fissuring, cracking or the like. The speed of movement of the apparatus of FIG. 1 in the direction 7 is of course selected to expose the surface 3 to the jet of plasma 2 during a short period of time suitable to heat only the above mentioned thin layer of hard material.

One can appreciate that during movement in the direction 7, the water jet 5 follows the plasma jet 2 on the surface 3, and suddenly cools the just heated thin layer of hard material. This causes a thermal shock which bursts particles of hard material, (crystals in the case of granite) at the surface 3. The water jet 5 also blows the burst particles off the surface 3.

Figure 2:
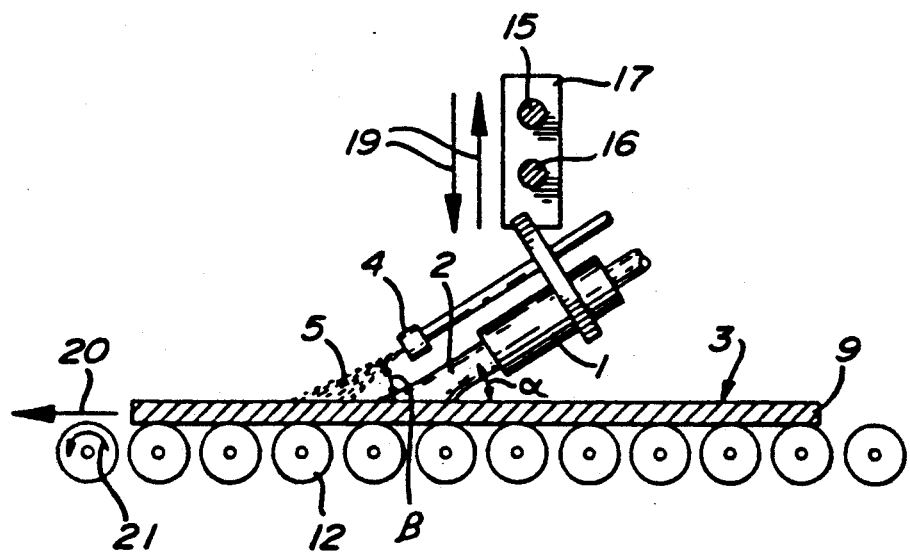
FIGS. 2 and 3 illustrate second positions and orientations of the plasma torch and water nozzle as well as an arrangement suitable to move the plasma torch and the water nozzle with respect to the surface to be treated.
Figure 3:
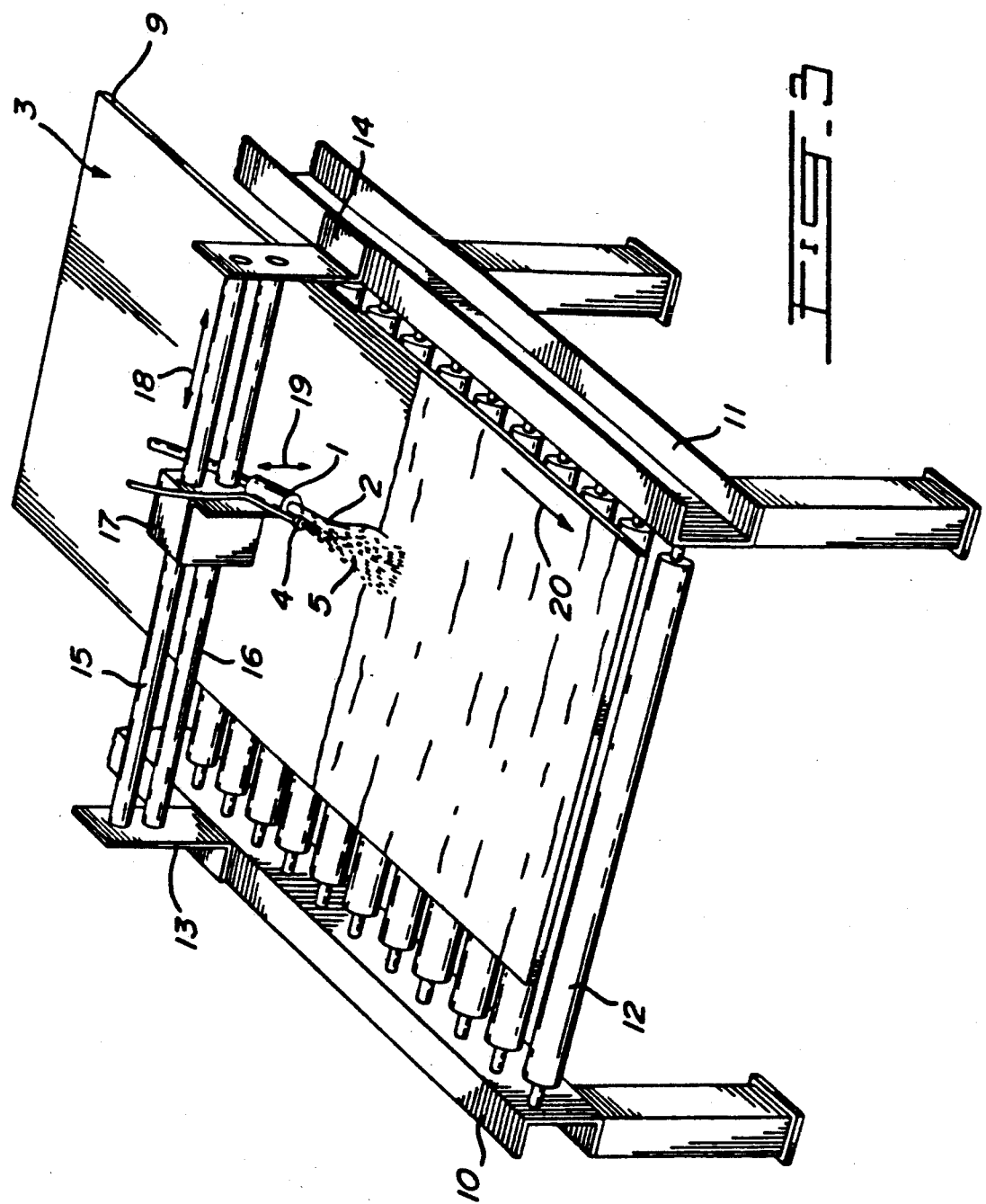

FIGS. 2 and 3 present an arrangement suitable to move the plasma torch 1 and the water nozzle 4 with respect to the surface 3 to be treated.

As illustrated in FIGS. 2 and 3, the plasma torch 1 and the water nozzle 4 can also be positioned and oriented to produce generally parallel plasma and water jets 2 and 5 both projected onto the surface 3 of a slab 9 of natural rock or artificial stone-like material. The acute angles $\alpha$ and $\beta$ between (a) the surface 3 and (b) the plasma and water jets 2 and 5, respectively, can be equal or not. It is also within the scope of the present invention to use an angle $\alpha$ or $\beta$ equal to 90°.

In FIGS. 2 and 3, the two jets 2 and 5 again lie in a same vertical plane.

The arrangement of FIGS. 2 and 3 comprises a frame comprising two longitudinal, lateral channel members 10 and 11 between which a plurality of transversal rollers such as 12 are rotatably mounted. The rollers 12 have the same diameter, rotate about respective, transversal rotation axes lying in a common, horizontal plane, and are driven by any conventional mechanism (not shown) including an electric motor.

Two support members 13 and 14 are L-shaped in vertical cross-section and have their lower ends secured to the channel members 10 and 11, respectively. Two elongated and cylindrical guide members 15 and 16 are fixed between the L-shaped support members 13 and 14. A support block 17 is slid on the guide members 15 and 16 in any of two opposite directions shown by the arrows 18 by means of, for example, an incorporated, remotely controlled direct current stepper motor (not shown).

The support block 17 also provides for vertical adjustment of the position of the plasma torch 1 and water nozzle 4 as indicated by the arrows 19 in FIGS. 2 and 3.

The structure of the arrangement of FIGS. 2 and 3 for moving the jets 2 and 5 with respect to the surface 3 of the slab 9 will not be further elaborated. Such a structure is given for the purpose of examplification only and is believed to be within the knowledge of one skilled in the art.

In order to treat a first strip of the surface 3, the rollers 12 are driven to rotate in the direction 21 (FIG. 2) whereby the slab 9 moves in the direction 20 parallel to the plane in which are lying the jets 2 and 5. It will be apparent from FIG. 2 that the jet of plasma 2 precedes on the surface 3 the water jet 5 to treat the latter surface in accordance with the present invention.

The block 17 is then laterally moved in one of the directions 18 and the slab 9 is moved again to treat the following adjacent strip of surface 3. The operation is repeated until all of the surface 3 has been treated.

Of course, the rollers 12 can be driven to rotate in both directions to produce a forth and back movement of the slab 9 in order to treat the successive strips of surface 3. Indeed, after a strip of surface 3 has been treated, the rollers 12 are rotated in a direction opposite to direction 21 to take the slab 9 back to its original position. The rollers 12 are then rotated again in the direction 21 to treat the following strip of surface 3. The speed of rotation of the rollers 12 in the direction opposite to direction 21 can be well higher than the speed of rotation in the direction 21 as no treatment of the surface 3 is carried out when the slab 9 is moved back to its original position, the water jet 5 then preceding the plasma jet 2 on the surface 3. To make the treatment process more efficient, the assembly torch 1—nozzle 4 can be designed for rotation by 180° with respect to the support block 17, whereby treatment of the strips of surface 3 in the two directions of rotation of the rollers is enabled, the plasma jet 2 preceding the water jet 5 on the surface 3 in both directions.

Concerning the parameters of operation of the apparatus in accordance with the invention, such as the angles α and β, the speed of displacement of the slab 9 in the direction 20, the distance between the points of impact of the water and plasma jets 2 and 5 on the surface 3, the "stand off" distance (the distance between the tip of the nozzle 8 of the torch 1 and the surface 3 in the direction of the plasma jet 2), etc, one cannot determine the parameters in terms of ranges of values, as the relation between them is a relation between numerous parameters of operation and is accordingly complex. On the contrary, these parameters of operation must be optimized for each particular application. It should however be pointed out that for a given application, there exists more than one optimal combination; if one parameter of operation is changed, optimal results in the treatment of the surface 3 can still be obtained when the other parameters are adequately modified.

Due to the high thermal gradients characterizing a high temperature jet of plasma, the "stand off" distance is a critical parameter of operation. This distance typically varies between 15 and 25 mm. When the "stand off" distance oversteps 25 mm, the design and the power level of the plasma torch should be greatly changed in order to obtain similar results in the treatment of the surface 3.

Also, the distance between the points of impact of the jets 2 and 5 on the surface 3 is typically 2 cm. This distance is adequate to suddenly cool the heated layer of hard material and cause the required thermal shock. It should however be pointed out that the orientation of the torch 1 and nozzle 4 and the distance between the two points of impact of the water and plasma jets 2 and 5 should be selected to prevent direct cooling by the water jet 5 of the area of surface 3 actually exposed to the plasma jet 2.

The angles α and β are advantageously selected so as to prevent projection of burst particles (or crystals) from the surface 3 onto the nozzle 8 of the plasma torch 1. This would considerably reduce the life time of the nozzle 8.

Excellent results have been obtained in the treatment of the surface of a gross grain granite of the "Caledionia" type using the structure of FIG. 1 and the following parameters or conditions of operation:

| | |
|---|---|
| Flow of plasma gas (nitrogen) | 1.4–2.0 m³/h (50–70 feet³/h) |
| Plasma power | 30–40 kW |
| "Stand-off" distance | 20 mm |
| Angle | 35° |
| Angle | 45° |
| Speed of movement in the direction 7 | 0.4–0.6 m/s |
| Width of the treated strip of surface 3 | 15–20 mm |

| -continued | |
|---|---|
| Pressure of the water jet 5 | 3.4 MPa (500 psi) |
| Distance between the points of impact of the plasma and water jets on the surface 3 | 2 cm |
| Thickness of the layer of burst particles (crumbled layer of hard material) | 1–2 mm |

Generally, with the structure of FIGS. 2 and 3, the following parameters of operation are advantageously used on an industrial scale to treat a surface of granite:

| | |
|---|---|
| Pressure of the water jet | 3.4–4.8 MPa (500–700 psi) |
| "Stand-off" distance | |
| with granite of the Caledonia type | 5 mm |
| with granite of the Black Cambrien type | 10 mm |
| Plasma power | 32–36 kW |
| Distance between the points of impact of the plasma and water jets on the surface 3 | 50 mm |
| Angle | 35° |
| Angle | 45° |
| Rate of treatment in factory for slabs 0.95 cm (⅜") thick | 6.9–8.3 m²/h (75–90 feet²/h) |

An apparatus in accordance with the invention is capable to treat the surface of natural rocks such as granite, the surface of artificial stone-like material such as concrete, as well as the surface of a body formed of an aggregate of natural stony pieces bounded together by means of an artificial stone-like material such as concrete, mortar and the like. The surface of bricks can also be treated in accordance with the present invention.

What is claimed is:

1. A method of treating the surface of a body of hard material constituted by natural rock and/or artificial stone-like material, comprising the steps of:
    producing a high temperature jet of plasma projected onto said surface;
    producing a high speed jet of cooling fluid projected onto said surface;
    moving said plasma jet on said surface sufficiently rapidly to enable said high temperature plasma jet to suddenly heat only a thin layer at said surface of said hard material; and
    moving the jet of cooling fluid on said surface, said high speed jet of cooling fluid being moved to follow the high temperature plasma jet on said surface, the jet of cooling fluid suddenly cooling said thin layer at said surface just heated by the plasma jet (a) to cause a thermal shock which bursts particles of said hard material at said surface and (b) to prevent deep penetration of heat into the hard material of said body, and said jet of cooling fluid blowing said particles off said surface.

2. A treating method according to claim 1, wherein the high temperature plasma jet defines a first angle with said surface, and said high speed jet of cooling fluid defines with said surface a second angle, at least one of said first and second angles being an acute angle.

3. A treating method according to claim 1, in which the said high temperature plasma jet defines a first acute angle with said surface, and said high speed jet of cooling fluid defines with said surface a second acute angle, said first and second acute angles being of different values.

4. A treating method according to claim 1, wherein the jet moving steps comprise the step of moving said jets of plasma and of cooling fluid so as to successively treat strips of said surface of hard material until all of the surface of the body has been treated.

5. A treating method according to claim 1, in which the plasma jet hits said surface at a first point of impact, and the jet of cooling fluid hits said surface at a second point of impact, a constant distance being maintained between the first and the second points of impact.

6. An apparatus for treating the surface of a body of hard material constituted by natural rock and/or artificial stone-like material, comprising:
first means for producing a high temperature jet of plasma projected onto said surface;
second means for producing a high speed jet of cooling fluid projected onto said surface;
mechanical support means on which said first and second jet producing means are mounted; and
means for moving said support means relative to said surface sufficiently rapidly to enable the high temperature plasma jet, projected onto said surface, to suddenly heat only a thin layer at said surface of said hard material, wherein said jet of cooling fluid follows the jet of plasma on said surface; in operation, the high speed jet of cooling fluid suddenly cooling the thin layer at said surface just heated by the plasma jet (a) to cause a thermal shock which bursts particles of said hard material at said surface and (b) to prevent deep penetration of heat in the hard material of said body, and said high speed jet of cooling fluid blowing said particles off said surface.

7. The apparatus of claim 6, wherein the plasma jet defines with said surface a first angle while the jet of cooling fluid defines with said surface a second angle, at least one of said first and second angles being an acute angle.

8. The apparatus of claim 6, wherein the jets of plasma and of cooling fluid lie in a common plane and define with said surface respective first and second angles of which at least one is an acute angle, and wherein the two jets of plasma and of cooling fluid are oriented in directions intersecting in said common plane.

9. The apparatus of claim 6, in which the jets of plasma and of cooling fluid define with said surface respective first and second acute angles of different values.

10. The apparatus of claim 6, wherein said means for moving the support means comprises means for moving the jets of plasma and of cooling fluid with respect to the said surface so as to successively treat adjacent narrow strips of the surface of hard material.

11. The apparatus of claim 6, wherein the jets of plasma and of cooling fluid lie in a common plane, and wherein said means for moving the support means with respect to said surface comprise means for moving said support means in a direction parallel to said common plane.

12. The apparatus of claim 6, in which the plasma jet producing means comprises a direct current plasma torch.

13. The apparatus of claim 6, in which the second means for producing a high speed jet of cooling fluid comprises means for producing a high speed jet of water, said water constituting the cooling fluid.

* * * * *